United States Patent [19]

Chikamune et al.

[11] Patent Number: 4,877,456

[45] Date of Patent: Oct. 31, 1989

[54] ANTIOXIDANT WAX FOR RUBBER

[75] Inventors: Kaoru Chikamune; Manabu Tokuda, both of Tokuyama; Kazuo Inoue, Nagaokakyo; Kyoshi Utsunomiya; Yoshii Hitofude, both of Tokuyama, all of Japan

[73] Assignee: Nippon Seiro Company, Limited, Tokyo, Japan

[21] Appl. No.: 277,828

[22] Filed: Nov. 30, 1988

[30] Foreign Application Priority Data

Nov. 30, 1987 [JP] Japan .................................. 62-300050
Oct. 28, 1988 [JP] Japan .................................. 63-270723

[51] Int. Cl.$^4$ .......................... C08L 91/06; C08H 3/00
[52] U.S. Cl. ....................................... 106/270; 208/20; 208/21; 252/399; 524/490
[58] Field of Search ................... 208/20, 21; 106/270; 524/490; 252/399

[56] References Cited

U.S. PATENT DOCUMENTS

| | | | |
|---|---|---|---|
| 2,967,817 | 1/1961 | Marple | 208/21 |
| 3,192,062 | 6/1965 | Arabian et al. | 106/270 |
| 3,423,348 | 1/1969 | Eigenfeld et al. | 524/490 |
| 3,826,735 | 7/1974 | Shinomura | 208/21 |
| 3,838,080 | 9/1974 | Shinomura et al. | 524/490 |

Primary Examiner—Theodore Morris
Attorney, Agent, or Firm—Sughrue, Mion, Zinn, Macpeak & Seas

[57] ABSTRACT

The present invention relates to an antioxidant was for rubber having a capacity to prevent the rubber from aging over a whole range from lower to higher temperatures and also providing excellent appearance and quality for the rubber products.

1 Claim, No Drawings

ANTIOXIDANT WAX FOR RUBBER

FIELD OF THE INVENTION

The present invention relates to an antioxidant wax for rubber which has a capacity to prevent aging over a whole range from lower to higher temperatures and also provides rubber products with excellent appearance and quality.

BACKGROUND OF THE INVENTION AND RELATED PRIOR ART

In general, if exposed to air or sun light a rubber produces cracks, and particularly if any tensile stress is added the cracks distinctly appear. For the prevention of these cracks so far it has been known to use (1) the antioxidants from amines and (2) those from wax. It is generally said that the former is subjected to a chemical reaction selectively with ozone and consumes the ozone in the surface layer of rubber to prevent the rubber from aging under statical or dynamical conditions, while the latter incorporated in a rubber exudes to the surface to form a thin film, which prevents the rubber from contacting with ozone to produce an antioxidizing effect, particularly under statical conditions. However, usually the above two kinds of agents are used together at the same time.

The antioxidant wax for rubber according to the present invention relates to the latter, namely, the statical antioxidant.

Various antioxidant wax for rubber have been commercially available from old times. For these antioxidant for rubber, however, the function exuding to form a thin film and the tendency in which the once formed thin film peels off and falls away, often varies depending on the used temperature, so that the previous commercial products have had their effective properties one-sided to either one of those temperature regions of higher, lower or medium. In order to improve this drawback there has been proposed an agent of broad carbon number distribution such as from 16 to 41 (U.S. Pat. No. 3,423,348 specification), or an agent which containes the linear hydrocarbons having a carbon number of 26 to 29 in from 25 to 70% and the linear hydrocarbons having a carbon number of 34 to 40 in from 30 to 75% respectively (Japanese Patent Application Publication Gazette No. 25062/1979) and others, but none of these are satisfactory. That is to say, due to their unsuitable carbon to carbon bonding mode and carbon number distribution, those agents have made excessive wax bloom exuded on the rubber surface at a specified temperature and the appearance of rubber surface significantly worse, and at the same time the increased amount of peeled off wax film called for the increased amount of added agents. This resulted in increased effects as plastisizer and deterioration of physical properties, and therefore was not economical.

DETAILED EXPLANATION OF THE INVENTION

The object of the present invention is to provide an antioxidant wax for rubber which has an antiaging capacity over the whole range of lower, medium, and higher temperatures, and in addition causes no excessive wax blooming phenomena, so that it provides the rubber surface with a excellently good appearance. The gist of the present invention resides in an antioxidant wax for rubber effective over the whole temperature range from lower to higher, in which the content of normal (hereinafter referred to an n- for short) saturated hydrocarbons is at least 75%, particularly the content of n-saturated hydrocarbons having a carbon number of 36 to 51 is from 20 to 45%, and further preferably the content of n-saturated hydrocarbons having a carbon number of 21 to 26 is from 5 to 25%.

The present inventors have studied on the optimum anti-ozone property of n-saturated hydrocarbons at various temperatures, and in the result they found that the n-saturated hydrocarbons effective to prevent cracks due to ozone at each temperature exhibited a substantially definite relation between the temperature and their carbon number. That is to say, though some deviations may be seen depending on the type of rubber and the compounding content, those effective for preventing the rubber from cracking caused by ozone are the n-saturated hydrocarbons among hydrocarbons as shown in Table 1. Besides, it was found that n-saturated hydrocarbons have a temperature dependent tendency, and the n-saturated hydrocarbons effective at a specified temperature are those having carbon numbers in a very limited range.

In general, the temperature range in which the antioxidizing property is most needed, is that from 0° C. to 60° C. That is to say, under 0° C. the activity of ozone is reduced, and over 60° C. the effects from causes other than ozone are increased. On studying the optimum carbon number of n-saturated hydrocarbon necessary for the prevention of aging, it was found that the optimum carbon number range is that from 21 to 51 as shown in Table 1 and the hydrocarbons having the substantially successive carbon numbers in this range need to be contained.

TABLE 1

| | Optimum carbon number of n-saturated hydrocarbon having excellent properties for preventing ozone-aging | | |
|---|---|---|---|
| | Type of rubber | | |
| Temperature (°C.) | NR-BR (1:1) Optimum carbon number of n-saturated hydrocarbon | SBR Optimum carbon number of n-saturated hydrocarbon | NR Optimum carbon number of n-saturated hydrocarbon |
| 0 | 22–23 | 21–23 | 21–24 |
| 10 | 25–26 | 23–26 | 24–26 |
| 20 | 27–30 | 26–29 | 26–30 |
| 30 | 30–33 | 30–32 | 30–33 |
| 40 | 33–36 | 34–36 | 33–36 |
| 50 | 38–40 | 36–40 | 36–40 |
| 60 | 44–51 | 40–50 | 44–50 |

For the application of these to practically used wax, even if the so far well known types of wax such as paraffin wax, semimicro wax or micro wax are simply blended to broaden the carbon number distribution, no satiable antioxidant wax for rubber can be obtained. In order to obtain an antioxidant which has excellent properties over the temperature range from lower to higher, the final product should be prepared by blending one or more types of wax selected from the group consisting of paraffin wax, semimicro wax, micro wax or intermediate products from them so that the content of n-saturated hydrocarbons determined by gas chromatographic analysis is at least 75%, that of n-saturated hydrocarbons having carbon number of 36 to 51 being from 20 to 45%, and further preferably that of n- saturated hydrocarbons having carbon number of 21 to 26 being from 5 to 25%.

On the other hand, if the content of n-saturated hydrocarbons is less than 75%, the antioxidizing property against ozone is bad, and if the carbon number distribution is outside that mentioned above, the antioxidizing property is not effective through the whole temperature range from lower to higher.

However some examples will be given to further definitely describe the present invention.

EXAMPLE 1

In Tables 2, 3 and 4 are shown the compounded rubbers according to NR-BR basic compound, SBR basic compound and NR basic compound respectively. As shown in Table 5, the antioxidant wax according to the present invention was added to the samples of NR-BR basic compound respectively in a rate of 1.5, 1, 1, 1.5 and 1.5 phr (wherein phr means a part per 100 part by weight of rubber), to those of SBR basic compound in 2, 2, 1, 1, 2 and 2 phr, and to those of NR basic compound in 1.5 phr. The sheet specimens of these rubbers were prepared by vulcanizing the NR-BR at 160° C. for 20 minutes, the SBR at 160° C. for 20 minutes, and the NR at 160° C. for 20 minutes respectively.

TABLE 2

| NR-BR basic compound | |
|---|---|
| Compounding agent | phr |
| Natural rubber | 50 |
| Butadiene rubber | 50 |
| Zinc white No. 1 | 3 |
| Stearic acid | 2 |
| Aromatic oil | 7 |
| HF carbon black | 50 |
| Valcanization acceleration CZ | 0.8 |
| Sulfur | 1.75 |
| Antioxidant 3C | 1.5 |

TABLE 2-continued

| NR-BR basic compound | |
|---|---|
| Compounding agent | phr |
| Vulcanizing condition 160° C., 20 min. | |

TABLE 3

| SBR basic compound | |
|---|---|
| Compounding agent | phr |
| SBR 1712 | 137.5 |
| Zinc white No. 1 | 3 |
| Stearic acid | 2.0 |
| N339 carbon black | 80 |
| Vulcanization acceleration CZ | 1.4 |
| Sulfur | 2.0 |
| Antioxidant 3C | 1.0 |
| Aromatic oil | 2.5 |
| Vulcanizing condition 160° C., 20 min. | |

TABLE 4

| NR basic compound | |
|---|---|
| Compounding agent | phr |
| Natural rubber | 100 |
| Zinc white No. 1 | 3 |
| Stearic acid | 2 |
| Aromatic oil | 5 |
| ISAF carbon black | 45 |
| Vulcanization acceleration CZ | 1 |
| Sulfur | 1.5 |
| Antioxidant | 1.5 |
| vulcanizing condition 160° C., 20 min. | |

Several pieces of the rubber sheet specimens obtained as mentioned above were prepared, each of which was fined in a definite rate of extention varying for every respective specimen. These specimens were put in a testing apparatus for degradation with ozone, and allowed to stand for 24 hours. Thus the antioxidizing property against ozone was determined by the critical strain caused from cracks, and at the same time said property was determined with respect to some previous commercial products (Comparative examples). The results are shown in Table 5.

TABLE 5

| WAX | Wax composition | | | Ozone degradation preventive capacity (critical deformation amount) (%) | | | | | | | | | | | | | | | | | |
|---|---|---|---|---|---|---|---|---|---|---|---|---|---|---|---|---|---|---|---|---|---|
| | | | | NR—BR basic compound Wax addition amount (phr) | | | | | | | SBR basic compound Wax addition amount (phr) | | | | | | NR basic compound Wax addition amount (phr) | | | | | |
| | nC21-26 | nC36-51 | n-Saturated hydrocarbon content | 1.5 | 1.5 | 1 | 1 | 1.5 | 1.5 | | 2 | 2 | 1 | 1 | 2 | 2 | 1.5 | 1.5 | 1.5 | 1.5 | 1.5 |
| | | | | Temperature (°C) | | | | | | | Temperature (°C) | | | | | | Temperature (°C) | | | | |
| | | | | 0 | 10 | 30 | 40 | 50 | 60 | | 0 | 10 | 30 | 40 | 50 | 60 | 10 | 30 | 40 | 50 | 60 |
| Example | | | | | | | | | | | | | | | | | | | | | |
| (1)P | 13.2 | 37.9 | 86.4 | 40< | 55< | 60< | 40< | 40< | 40< | | | | | | | | 40< | 40< | 40< | 40< | 40< |
| (1)Q | 19.5 | 30.8 | 91.5 | 40< | 55< | 60< | 40< | 40< | 40< | | | | | | | | 40< | 40< | 40< | 40< | 40< |
| (1)R | 21.0 | 28.3 | 90.0 | 40< | 55< | 60< | 40< | 40< | 40< | | 40 | 40< | 50< | 50< | 40< | 40< | 40< | 40< | 40< | 40< | 40< |
| (1)S | 21.3 | 29.9 | 92.9 | 40< | 55< | 60< | 40< | 40< | 40< | | | | | | | | 40< | 40< | 40< | 40< | 40< |
| (1)T | 17.2 | 27.2 | 93.8 | 40< | 55< | 60< | 40< | 40< | 40< | | 30 | 40 | 50< | 50< | 40< | 40< | | | | | |
| (1)U | 8.4 | 32.5 | 87.1 | 30 | 55< | 60< | 40< | 40< | 40< | | 30 | 40< | 50< | 50< | 40< | 40< | | | | | |
| (1)V | 10.3 | 28.9 | 90.2 | 30 | 55< | 60< | 40< | 40< | 40< | | 30 | 40 | 50< | 50< | 40 | 40< | | | | | |
| (1)W | 6.9 | 41.0 | 91.0 | 30 | 55< | 60< | 40< | 40< | 40< | | 30 | 40< | 50< | 50< | 40< | 40< | | | | | |
| (1)X | 8.9 | 32.6 | 90.8 | 30 | 55< | 60< | 40< | 40< | 40< | | 30 | 40< | 50< | 50< | 40< | 40< | | | | | |
| (1)Y | 11.2 | 33.8 | 76.0 | 40 | 55< | 60< | 40< | 40< | 40< | | 30 | 40< | 50< | 50< | 40< | 40< | | | | | |
| (1)Z | 13.4 | 29.8 | 80.9 | 40< | 55< | 60< | 40< | 40< | 40< | | 30 | 40< | 50< | 50< | 40< | 40< | | | | | |
| Comparative example | | | | | | | | | | | | | | | | | | | | | |
| (2)A | 4.9 | 26.6 | 46.7 | 20 | 40 | 45 | 25 | 15 | 10 | | 30 | 35 | 50< | 50< | 25 | 15 | | | | | |
| (2)B | 20.0 | 7.3 | 82.3 | 40< | 55< | 60< | 25 | 10 | 10 | | | | | | | | | | | | |
| (2)C | 23.3 | 3.9 | 82.9 | 40< | 55< | 60< | 25 | 10 | 10 | | | | | | | | | | | | |
| (2)D | 13.4 | 7.4 | 73.6 | 30 | 45 | 60< | 25 | 10 | 10 | | | | | | | | | | | | |
| (2)E | 0.8 | 27.1 | 64.0 | 20 | 40 | 60< | 40 | 25 | 10 | | | | | | | | | | | | |
| (2)F | 16.3 | 6.4 | 76.2 | 40 | 45 | 60< | 25 | 10 | 10 | | | | | | | | | | | | |
| (2)G | 16.7 | 6.6 | 75.2 | 40 | 55 | 60< | 25 | 10 | 10 | | | | | | | | | | | | |
| (2)H | 12.7 | 17.3 | 85.8 | 30 | 55 | 50 | 25 | 10 | 10 | | 20 | 35 | 50< | 50< | 25 | 10 | | | | | |
| (2)I | 5.1 | 16.4 | 67.5 | 20 | 55< | 60< | 30 | 15 | 10 | | | | | | | | | | | | |
| (2)J | 4.8 | 17.7 | 67.2 | 20 | 55 | 45 | 40< | 25 | 10 | | | | | | | | 20 | 20 | 20 | 20 | 10 |
| (2)K | 3.7 | 19.6 | 62.1 | 20 | 35 | 60< | 40< | 40< | 10 | | | | | | | | 10 | 20 | 40< | 40< | 10 |
| (2)L | 21.3 | 6.9 | 82.9 | 40< | 55< | 60< | 25 | 10 | 10 | | | | | | | | 20 | 20 | 20 | 20 | 10 |

(1) product of the invention
(2) Commercial product

As is clear from the results of Table 5, any antioxidant wax according to the present invention excels the previous commercial products in ozone degradation preventive capacity over the whole temperature range from 0° C. to 60° C., and furthermore any difference in said capacity with temperature difference as is often the case with the previous products was not recognized, but the property was uniformly effective.

EXAMPLE 2

In order to determine the whitening prevention capacity, the sheets prepared by the same manner as Example 1 were measured in respect of the amount of wax blooming. The results are shown in Table 6.

TABLE 6

|  | Wax | Wax blooming amount (mg/210 cm2) | |
|---|---|---|---|
|  |  | 30° C. | 40° C. |
| Example | (1) P | 0.9 | 15.3 |
|  | (1) S | 1.0 | 16.5 |
|  | (1) V | 1.2 | 14.5 |
|  | (1) Z | 0.8 | 16.9 |
| Comparative | (2) B | 27.1 | 86.2 |
|  | (2) F | 20.4 | 69.0 |

TABLE 6-continued

|  | Wax | Wax blooming amount (mg/210 cm2) | |
|---|---|---|---|
|  |  | 30° C. | 40° C. |
| Example | (2) H | 12.4 | 43.6 |

(1) Product of the invention
(2) Commercial product

Measuring method of wax blooming amount:

A rubber sheet (14.5 cm × 14.5 cm × 0.3 cm) was hung in a thermostat dryer, taken out after 10 days, and the wax produced by blooming was scraped off to be weighted.

Practically, in most cases where the appearance of rubber whitens due to wax blooming and it causes trouble, the rubber has been stored at a room temperature lower than 40° C. for a long time. If the rubber is stored at a temperature lower than 20° C., the amount of wax always is small. Therefore, the wax blooming amount was measured at 30° C. and 40° C. as shown in Table 6.

As shown in Table 6, the antioxidant, wax for rubber according to the present invention gave smaller amounts of wax blooming in comparison with the previous products either at 30° C. or 40° C., and also excellently beautiful appearance.

What is claimed is:

1. An antioxidant wax characterized in that the content of normal saturated hydrocarbon is at least 75%, which contains the normal saturated hydrocarbon having a carbon number of 36 to 51 in from 20 to 45% and the normal saturated hydrocarbon having a carbon number of 21 to 26 in from 5 to 25% respectively.

* * * * *